United States Patent
Martin et al.

(10) Patent No.: US 12,349,713 B2
(45) Date of Patent: Jul. 8, 2025

(54) METHODS FOR THE IMPROVEMENT AND MAINTENANCE OF WEIGHT LOSS

(71) Applicant: SOCIETE DES PRODUITS NESTLE S.A., Vevey (CH)

(72) Inventors: Francois-Pierre Martin, Vuisternens-devant-Romont (CH); Jorg Hager, Houtaud (FR); Jerome Carayol, Pully (CH); Armand Valsesia, Chavannes-pres-Renens (CH)

(73) Assignee: Societe des Produits Nestle S.A., Vevey (CH)

( * ) Notice: Subject to any disclaimer, the term of this patent is extended or adjusted under 35 U.S.C. 154(b) by 636 days.

(21) Appl. No.: 17/761,655

(22) PCT Filed: Sep. 17, 2020

(86) PCT No.: PCT/EP2020/075930
§ 371 (c)(1),
(2) Date: Mar. 18, 2022

(87) PCT Pub. No.: WO2021/058358
PCT Pub. Date: Apr. 1, 2021

(65) Prior Publication Data
US 2022/0338521 A1  Oct. 27, 2022

(30) Foreign Application Priority Data
Sep. 23, 2019  (EP) .................... 19198863

(51) Int. Cl.
*A23L 33/175* (2016.01)
*A23L 33/00* (2016.01)

(52) U.S. Cl.
CPC ............ *A23L 33/175* (2016.08); *A23L 33/30* (2016.08); *A23L 33/40* (2016.08); *A23V 2002/00* (2013.01)

(58) Field of Classification Search
CPC ............... A23L 33/00; A23L 33/175
See application file for complete search history.

(56) References Cited

U.S. PATENT DOCUMENTS

| | | | | |
|---|---|---|---|---|
| 4,042,687 A | * | 8/1977 | Gans | A23L 33/175 514/4.8 |
| 2004/0265360 A1 | * | 12/2004 | Venturi | A23L 33/15 424/439 |
| 2005/0002992 A1 | * | 1/2005 | McCleary | A23L 33/16 514/561 |
| 2005/0025812 A1 | * | 2/2005 | Forest | A61K 36/17 424/776 |
| 2006/0264498 A1 | * | 11/2006 | Kamiya | A23K 20/142 514/423 |
| 2009/0018072 A1 | | 1/2009 | Scheele | |
| 2019/0059433 A1 | | 2/2019 | Lamming, Jr. et al. | |

FOREIGN PATENT DOCUMENTS

| | | |
|---|---|---|
| CN | 101090717 A | 12/2007 |
| CN | 103458887 A | 12/2013 |
| CN | 106686990 A | 5/2017 |
| EP | 1410722 | 4/2004 |
| JP | H06024977 A | 2/1994 |
| JP | 2005514342 A | 5/2005 |
| JP | 2007117005 A | 5/2007 |
| WO | 02087562 | 11/2002 |
| WO | 2004087657 A1 | 10/2004 |
| WO | 2015184401 | 12/2015 |

OTHER PUBLICATIONS

Xiao-Bo et al., "Experimental Study on Slimming Using L-Hydroxyproline", Amino Acids and Biotic Resources, vol. 25, Issue No. 3, Dec. 31, 2003, pp. 60-62.
Office Action Received for Application No. CN202080065769.5, mailed on Jul. 26, 2023, 11 Pages of Official Copy.
Ard et al., "Effectiveness of a Total Meal Replacement Program (OPTIFAST Program) on Weight Loss: Results from the OPTIWIN Study", Obesity, vol. 27, Issue No. 1, Jan. 2019, pp. 22-29.
Japanese Office Action for Appl No. 2022-515930 dated Oct. 1, 2024, 14 pages.

* cited by examiner

*Primary Examiner* — Anthony J Weier
(74) *Attorney, Agent, or Firm* — K&L Gates LLP

(57) ABSTRACT

The present invention provides a nutritional composition for use in a weight loss dietary intervention or maintenance of weight, particularly following a dietary intervention, preferably a low caloric diet intervention. The nutritional composition having one or more amino acids, or combinations thereof, selected from the group consisting of: proline, histidine, glycine, and/or hydroxyproline, that can be used to help the weight loss in obese subjects that are resistant to weight loss by caloric restricted dietary interventions alone. In addition, the nutritional composition of the invention can be used to help maintain the weight loss, particularly after dietary intervention.

20 Claims, No Drawings

METHODS FOR THE IMPROVEMENT AND MAINTENANCE OF WEIGHT LOSS

CROSS REFERENCE TO RELATED APPLICATIONS

The present application is a National Stage of International Application No. PCT/EP2020/075930, filed on Sep. 17, 2020. which claims priority to European Patent Application No. 19198863.3, filed on Sep. 23, 2019, the entire contents of which are being incorporated herein by reference.

FIELD OF INVENTION

The present invention provides a nutritional composition for use in a weight loss dietary intervention or maintenance of weight, particularly following a dietary intervention, preferably a low caloric diet intervention. The nutritional composition comprises one or more amino acids, or combinations thereof, selected from the group consisting of: proline, histidine, glycine, and/or hydroxyproline, that can be used to help the weight loss in obese subjects that are resistant to weight loss by caloric restricted dietary interventions alone. In addition, the nutritional composition of the invention can be used to help maintain the weight loss, particularly after dietary intervention.

BACKGROUND OF THE INVENTION

Obesity is a chronic metabolic disorder that has reached epidemic proportions in many areas of the world. Obesity is the major risk factor for serious co-morbidities such as type 2 diabetes mellitus, cardiovascular disease, dyslipidaemia and certain types of cancer (World Health Organ Tech Rep Ser. 2000; 894:i-xii, 1-253).

It has long been recognized that low calorie dietary interventions can be very efficient in reducing weight and that this weight loss is generally accompanied by an improvement for the risk of obesity related co-morbidities, in particular type 2 diabetes mellitus. Empirical data suggests that a weight loss of at least 10% of the initial weight results in a considerable decrease in risk for obesity related co-morbidities (World Health Organ Tech Rep Ser. 2000; 894:i-xii, 1-253).

However, the capacity to lose weight shows large inter-subject variability. Some studies illustrate that a percentage of the population do not successfully lose weight on a caloric restricted or low calorie diet (Ghosh, S. et al., Obesity, 2011, 19(2):457-463). This leads to an unrealistic expectation of weight loss, which in turn causes non-compliance, drop-outs and generally unsuccessful dietary intervention. Indeed, studies have shown a 10-fold variation to lose weight in highly compliant subjects of similar BMI and undergoing the same standardized weight loss program. These observations have lead to the definition of an obese weight loss resistant obese phenotype (Harper et al., Diabetes, (2002) 51:2459-2466).

Some studies have suggested that subjects who are predicted to have a weight loss resistant obese phenotype or diet resistant obese phenotype may consider bariatric surgery. Bariatric surgery includes various surgical procedures performed to treat obesity by modification of the gastrointestinal tract to reduce nutrient intake and/or absorption.

Clearly, there is a need for compositions and methods which are more convenient and less invasive for weight loss resistant obese or diet resistant obese subjects.

SUMMARY OF THE INVENTION

Nutritional Composition

In some embodiments, there is provided a composition, particularly a nutritional composition, for use in weight loss during a dietary intervention or maintenance of weight following a dietary intervention. In a preferred embodiment, the dietary intervention is a low caloric diet.

In one embodiment, the nutritional composition comprises one or more amino acids for use in weight loss during a dietary intervention or maintenance of weight following a dietary intervention. In a preferred embodiment, the dietary intervention is a low caloric diet.

In one embodiment, the nutritional composition comprises one or more amino acids selected from the group consisting of: proline; histidine; glycine; and/or hydroxyproline; or mixtures thereof for use in weight loss during dietary intervention or maintenance of weight following a dietary intervention. In a preferred embodiment, the dietary intervention is a low caloric diet.

In one embodiment, the nutritional composition contains at least proline for use in weight loss during a dietary intervention or maintenance of weight following a dietary intervention. In a preferred embodiment, the dietary intervention is a low caloric diet.

In one embodiment, the nutritional composition contains at least proline and histidine for use in weight loss during a dietary intervention or maintenance of weight following a dietary intervention. In a preferred embodiment, the dietary intervention is a low caloric diet.

In one embodiment, the nutritional composition contains at least proline, histidine and glycine for use in weight loss during a dietary intervention or maintenance of weight following a dietary intervention. In a preferred embodiment, the dietary intervention is a low caloric diet.

In one embodiment, the nutritional composition contains at least proline, histidine, glycine and hydroxyproline for use in weight loss during a dietary intervention or maintenance of weight following a dietary intervention. In a preferred embodiment, the dietary intervention is a low caloric diet.

In a preferred embodiment, the nutritional composition of the invention improves fat mass loss in the subject following dietary intervention. In a preferred embodiment, the dietary intervention is a low caloric diet.

In another preferred embodiment, the nutritional composition of the invention improves BMI in the subject following dietary intervention. In a preferred embodiment, the dietary intervention is a low caloric diet.

In a further preferred embodiment, the nutritional composition of the invention maintains fat mass loss in the subject following dietary intervention. In a preferred embodiment, the dietary intervention is a low caloric diet.

In another preferred embodiment, the nutritional composition of the invention maintains BMI in the subject following dietary intervention. In a preferred embodiment, the dietary intervention is a low caloric diet.

In one embodiment, the nutritional composition containing one or more amino acids of the invention is formulated together with (i) a source of fats, (ii) a source of carbohydrates, and (iii) a source of proteins into a diet product and is provided during the low caloric dietary intervention to help weight loss.

In one embodiment, the nutritional composition containing the one or more amino acids are administered simultaneously, sequentially or separately to a subject.

In another embodiment, the nutritional composition containing the one or more amino acids are administered together formulated in a diet product containing (i) a source of fats, (ii) a source of carbohydrates, and (iii) a source of proteins.

In one embodiment, the nutritional formulation of the diet product containing the nutritional composition of the invention with the one or more amino acids of the invention, provides not less than 40% of the subject's average daily calorie intake during the low caloric dietary intervention.

In one embodiment, the nutritional formulation of the diet product containing the nutritional composition of the invention with the one or more amino acids of the invention, provides not less than 70% of the subject's average daily calorie intake during the low caloric dietary intervention.

In one embodiment, the nutritional formulation of the diet product containing the nutritional composition of the invention with the one or more amino acids of the invention, provides not less than 80% of the subject's average daily calorie intake during the low caloric dietary intervention.

In one embodiment, the nutritional formulation of the diet product containing the nutritional composition of the invention with the one or more amino acids of the invention, provides not less than 90% of the subject's average daily calorie intake during the low caloric dietary intervention.

In one embodiment, the nutritional formulation of the diet product containing the nutritional composition of the invention with the one or more amino acids of the invention, provides 100% of the subject's daily calorie intake during the low caloric dietary intervention.

In one embodiment, the subject's average daily calorie intake is about 600 kcal to about 1500 kcal during the low dietary intervention.

In another embodiment, the nutritional composition containing the one or more amino acids of the invention is formulated together with (i) a source of fats, (ii) a source of carbohydrates, and (iii) a source of proteins into a diet product and is provided after weight loss to help maintain the weight lost.

In one embodiment, the nutritional formulation of the diet product containing the nutritional composition of the invention with the one or more amino acids of the invention, provides 40% of the subject's daily calorie intake after the low caloric dietary intervention during the weight maintenance period.

In one embodiment, the nutritional formulation of the diet product containing the nutritional composition of the invention with the one or more amino acids of the invention, provides 30% of the subject's daily calorie intake after the low caloric dietary intervention during the weight maintenance period.

In one embodiment, the nutritional formulation of the diet product containing the nutritional composition of the invention with the one or more amino acids of the invention, provides 20% of the subject's daily calorie intake after the low caloric dietary intervention during the weight maintenance period.

In one embodiment, the nutritional formulation of the diet product containing the nutritional composition of the invention with the one or more amino acids of the invention, provides 10% of the subject's daily calorie intake after the low caloric dietary intervention during the weight maintenance period.

In another embodiment, after the ideal weight has been achieved, the subject may take the nutritional formulation of the diet product containing the nutritional composition of the invention with the one or more amino acids of the invention, for up to about 26 weeks during the weight maintenance period.

In one embodiment, the nutritional composition provides 1 g to 10 g of the subject's average daily proline intake during the dietary intervention or after dietary intervention during the weight maintenance period.

In one embodiment, the nutritional composition provides 1 g to 10 g of the subject's average daily histidine intake during the dietary intervention or after dietary intervention during the weight maintenance period.

In one embodiment, the nutritional composition provides 1 g to 10 g of the subject's average daily glycine intake during the dietary intervention or after dietary intervention during the weight maintenance period.

In one embodiment, the nutritional composition provides 1 g to 10 g of the subject's average daily hydroxyproline intake during the dietary intervention or after dietary intervention during the weight maintenance period.

In one embodiment, the subject is diagnosed as diet resistant obese or weight loss resistant obese before the dietary intervention and in need of a nutritional composition of the invention.

In one embodiment, the subject is diagnosed as diet resistant obese or weight loss resistant obese before the dietary intervention by measuring the levels of the amino acids: proline, histidine, glycine, and/or hydroxyproline, levels in the blood, particularly in the red blood cells and when any of these are lower than the reference values, the subject may be considered as being at risk of being diet resistant or weight loss resistant.

Amino Acids

In several embodiments, the nutritional composition of the inventions comprises one or more amino acids selected from the group consisting of: proline, histidine, glycine and/or hydroxyproline.

Methods and Uses

In one embodiment, the nutritional composition of the invention is suitable for use in the weight loss during low caloric dietary intervention.

In one embodiment, the nutritional composition is suitable for use in the improvement of fat mass loss during low caloric dietary intervention.

In another embodiment, the nutritional composition is suitable for use in improvement of BMI during low caloric dietary intervention.

In one embodiment, the nutritional composition is suitable for use in the maintenance of weight loss after dietary intervention.

In one embodiment, the nutritional composition is suitable for use in the maintenance of fat mass loss after dietary intervention.

In another embodiment, the nutritional composition is suitable for use in maintenance of BMI after dietary intervention.

In one embodiment, the dietary intervention is the administration of a nutritional composition of the invention as a part of a low calorie diet.

In one embodiment, the low calorie diet comprises a decreased consumption of fat.

In one embodiment, the low calorie diet comprises an increase in consumption of low fat foods.

In one embodiment, the nutritional composition of the invention and the low calorie diet provide the subject with on average between 600 to about 1500 kcal per day.

In one embodiment, the low calorie diet is a reduction in calorie intake by on average not less less than 10% per day compared to average calorie intake per day before the administration of the low calorie diet.

In one embodiment, the low calorie diet is a reduction in calorie intake by on average not less less than 15% per day compared to average calorie intake per day before the administration of the low calorie diet.

In one embodiment, the low calorie diet is a reduction in calorie intake by on average not less less than 20% per day compared to average calorie intake per day before the administration of the low calorie diet.

In one embodiment, the low calorie diet is a reduced in calorie intake compared to average calorie intake per day in the 2 week period immediately before the administration of the low calorie diet.

In one embodiment, the low calorie diet is administered for a duration of up to 12 weeks. In another embodiment, the low caloric diet is administered for a duration from 6 to 12 weeks.

There is also provided a method of making a composition of the invention, particularly a nutritional composition of the invention for administration of the nutritional composition in a form suitable for a weight resistant obese subject or diet resistant obese subject.

In one embodiment, the method of weight loss using a nutritional composition of the invention is also suitable for the improvement of fat mass loss and BMI during a dietary intervention.

In one embodiment, the method of weight loss using a nutritional composition of the invention is suitable for administration of a low calorie diet to a diet resistant obese or weight loss resistant obese subject.

The method of the invention may further comprise determining one or more anthropometric measures and/or lifestyle characteristics of the subject to determine whether the subject is in need of the composition of the invention to achieve weight loss or to maintain weight loss.

The anthropometric measure may be selected from the group consisting of gender, weight, height, age.

The lifestyle characteristic may be, for example, whether the subject is a smoker or a non-smoker, whether the subject consumes on average more than the recommended daily intake of alcohol, or whether the subject performs on average less than the recommended daily levels of exercise.

There is also provided a method for optimizing one or more dietary interventions comprising:

assessing the predisposition of a subject to weight loss attainable by one or more dietary interventions and/or the predisposition of a subject to maintenance of weight loss attainable in a subject following one or more dietary interventions; and applying one or more dietary interventions to the subject.

In one embodiment, the dietary intervention is a low calorie diet.

In another aspect of the invention, there is provided a low calorie diet for use in a weight loss program, wherein a diet product is administered to a subject that is predicted to attain weight loss.

In another aspect there is provided a diet product for use as part of a low calorie diet for weight loss, wherein the diet product is administered to a subject that is predicted to attain weight loss or maintenance.

In another aspect there is provided a diet product for use as part of a low calorie diet for weight loss, wherein the diet product is administered to a subject that is predicted to attain both weight maintenance and weight loss.

In another aspect there is provided a diet product for use in treating obesity or an obesity-related disorder, wherein the diet product is administered to a subject that is predicted to attain weight maintenance and/or weight loss.

In one embodiment, the diet product comprises Optifast® or Modifast® with the addition of the one or more amino acids of the invention.

Kit of Parts

There is provided a kit of parts for use in accordance with the invention, said kit comprising the parts: (i) a diet product; (ii) the nutritional composition containing one or more amino acids of the invention and (iii) instructions for their use.

In one embodiment, the diet product comprises one or more of (i) a source of fats; (ii) a source of carbohydrates; and (iii) a source of proteins.

In one embodiment, the diet product comprises two or more of (i) a source of fats, (ii) a source of carbohydrates, and (iii) a source of proteins.

In one embodiment, the kit of parts containing (i) the diet product and (ii) the nutritional composition containing the one or more amino acids with (iii) instructions for their use are administered simultaneously, sequentially or separately to a diet resistant obese or weight loss resistant obese subject.

In one embodiment, the nutritional composition containing the one or more amino acids are administered with the specified one or more amino acids administered simultaneously, sequentially or separately to a subject.

In another embodiment, the nutritional composition containing the one or more amino acids are administered together formulated together in a diet product containing (i) a source of fats, (ii) a source of carbohydrates, and (iii) a source of proteins.

In one embodiment, the kit is for use in the improvement of weight loss during a dietary intervention, particularly a low caloric dietary intervention.

In one embodiment, the kit is for use in maintenance of weight loss after a dietary intervention, particularly a low caloric dietary intervention.

There is also provided a method of making a kit of parts of the invention.

DETAILED DESCRIPTION OF THE INVENTION

All percentages are by weight of the total weight of the composition unless expressed otherwise. Similarly, all ratios are by weight unless expressed otherwise. When reference is made to the pH, values correspond to pH measured at 25° C. with standard equipment. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. "Consisting essentially of" means that the embodiment comprises more than 50 wt. % of the identified components, preferably at least 75 wt. % of the identified components, more preferably at least 85 wt. % of the identified components, most preferably at least 95 wt. % of the identified components, for example at least 99 wt. % of the identified components.

Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

The relative terms "improved," "increased," "enhanced" and the like refer to the effects of the composition comprising both one or more amino acids relative to a composition without the one or more amino acids of the invention or with less of the one or more amino acids, but otherwise identical.

The terms "diet product" and "nutritional composition" and "nutritional formulation" mean a product or composition comprising at least one amino acid of the invention that is intended for ingestion by an individual such as a human and provides at least one nutrient to the individual.

The compositions of the present disclosure, including the many embodiments described herein, can comprise, consist of, or consist essentially of the essential elements and limitations described herein, as well as any additional or optional ingredients, components, or limitations described herein or otherwise useful in a diet.

As used herein, "complete nutrition" contains sufficient types and levels of macronutrients (protein, fats and carbohydrates) and micronutrients to be sufficient to be a sole source of nutrition for the animal to which the composition is administered. Individuals can receive 100% of their nutritional requirements from such complete nutritional compositions.

"Animal" includes, but is not limited to, mammals, which includes but is not limited to rodents, aquatic mammals, domestic animals such as dogs and cats, farm animals such as sheep, pigs, cows and horses, and humans. Where "animal," "mammal" or a plural thereof is used, these terms also apply to any animal that is capable of the effect exhibited or intended to be exhibited by the context of the passage. As used herein, the term "subject" or "patient" is understood to include an animal, for example a mammal, and preferably a human that is receiving or intended to receive treatment, as treatment is herein defined. While the terms "individual" and "patient" are often used herein to refer to a human, the present disclosure is not so limited.

Accordingly, the terms "subject", "individual" and "patient" refer to any animal, mammal or human that can benefit from the methods and compositions disclosed herein.
Composition and Uses Thereof The "composition", particularly the "nutritional composition" and/or "nutritional formulation" into a "diet product" containing amino acids of the invention is suitable for use in the improvement of weight loss during a dietary intervention and maintenance of weight after weight loss. Weight loss can be measured by any technique known to the person skilled in the art.

"Weight loss" as defined herein may refer to a reduction in parameters such as weight (e.g. in kilograms), body mass index (kgm-2), waist-hip ratio (e.g. in centimetres), fat mass (e.g. in kilograms), hip circumference (e.g. in centimetres) or waist circumference (e.g. in centimetres).

Weight loss may be calculated by subtracting the value of one or more of the aforementioned parameters at the end of an intervention from the value of said parameter at the onset of the intervention (e.g. a use according to the present invention).

The degree of weight loss may be expressed as a percentage change of one of the aforementioned weight phenotype parameters (e.g. a percentage change in a subject's body weight (e.g. in kilograms) or body mass index (kgm-2). For example, a subject may lose at least 10% of their initial body weight, at least 8% of their initial body weight, or at least 5% of their initial body weight. By way of example only, a subject may lose between 5 and 10% of their initial body weight.

In one embodiment, a degree of weight loss of at least 10% of initial body weight results in a considerable decrease in risk for obesity related co-morbidities.

"Maintaining weight loss" as defined herein may refer to the maintenance in parameters such as weight (e.g. in kilograms), body mass index (kgm-2), waist-hip ratio (e.g. in centimetres) fat mass (e.g. in kilograms), hip circumference (e.g. in centimetres) or waist circumference (e.g. in centimetres) or maintenance of fat mass following an intervention such as a dietary intervention.

Typically, maintenance of weight loss occurs after a period of attaining weight loss.

In one aspect, the present invention provides the non-therapeutic use of the nutritional composition of the invention to maintain a healthy body composition after a period weight loss.

The degree of weight maintenance may be calculated by determining the change in one or more of the aforementioned parameters during a period of time. The period of time may be for example at least 12, 15, 20, 26, 30, 36, 40, 46 or 50 weeks.

The degree of weight maintenance may be expressed as the weight regained during a period following attainment of weight loss, for example as a percentage of the weight lost during attainment of weight loss.

In one aspect, the present invention provides a nutritional composition and/or formulation into a diet product of the invention for use in attaining or maintaining weight loss in a subject.

The nutritional composition and/or formulation into a diet product of the invention can also improve fat mass loss and BMI, which can be measured by any technique known to the person skilled in the art.

Subject

The subject of the invention is preferably a mammal. In a preferred embodiment, the subject is a human. The subject may alternatively be a non-human mammal, including for example, a horse, cow, sheep or pig. In one embodiment, the subject is a companion animal such as a dog or a cat.

"Overweight" is defined for an adult human as having a BMI between 25 and 30. "Body mass index" or "BMI"

means the ratio of weight in kg divided by the height in metres, squared. "Obesity" is a condition in which the natural energy reserve, stored in the fatty tissue of animals, in particular humans and other mammals, is increased to a point where it is associated with certain health conditions or increased mortality. "Obese" is defined for an adult human as having a BMI greater than 30. "Normal weight" for an adult human is defined as a BMI of 18.5 to 25, whereas "underweight" may be defined as a BMI of less than 18.5.

Obesity related disorder refers to any condition which an obese individual is at an increased risk of developing.

The obesity-related disorder may be diabetes (e.g. type 2 diabetes), stroke, high cholesterol, cardiovascular disease, insulin resistance, coronary heart disease, metabolic syndrome, hypertension or fatty liver.

The nutritional composition for use as described herein may be for use in reducing fat mass and substantially maintaining lean mass in a subject.

"Fat mass" refers to the portion of a subject's body which is composed of fat. Fat mass may be determined using a wide range of methods, for example caliper-based measurements of skinfold thickness, Dual energy X-ray absorptiometry, CT or MRI scanning or bioelectrical impedance analysis.

Reducing fat mass may mean that fat mass is reduced by at least 1%, at least 2%, at least 5%, at least 10%, at least 15%, at least 20%, at least 30%, at least 40% or at least 50%.

"Lean mass" or "lean body mass" refers to the part of body composition that is defined as the difference between total body weight and body fat weight. This means that it counts the mass of all organs except body fat, including bones, muscles, blood, skin, and everything else. Maintaining lean body mass is important for optimal metabolism, normal physical activity and good health.

Substantially maintaining lean mass may mean that lean mass alters by, for example, less than 7%, less than 5%, less than 4%, less than 3%, less than 2% or less than 1% following or during an intervention.

Preferably, the majority of weight loss is due to a reduction in non-lean mass or fat mass rather than lean mass.

The subject of the invention is preferably diet resistant obese or weight loss resistant obese. A "diet resistant obese subject" or "weight loss resistant obese" can be defined as a subject in the lowest quintile of rate of weight loss (based on age and initial weight) in a group of subjects at 6 weeks after the initiation of a dietary intervention (Harper et al., 2002).

Preferably the degree of weight loss is represented by the number of BMI units lost, where BMI loss=((BMI1−BMI2)*100)/BMI1, wherein BMI1 is the body mass index of the subject before the dietary intervention and BMI2 is the predicted body mass index of the subject after the dietary intervention.

Dietary Intervention

The term "dietary intervention" is taken to mean an external factor applied to a subject which causes a change in the subject's diet. Preferably, the dietary intervention is a low calorie diet.

A "low calorie diet" comprises an average calorie intake of about 600 to about 1500 kcal/day, more preferably an average of about 600 to about 1200 kcal/day, more preferably an average of about 700 to about 900 kcal/day, most preferably an average of about 800 kcal/day.

In one embodiment, the low calorie diet may comprise a predetermined amount of vegetables per day, preferably up to about 400 g vegetables/day, e.g. about 200 g vegetables/day. Low fat foods may include wholemeal flour and bread, porridge oats, high-fibre breakfast cereals, wholegrain rice and pasta, vegetables and fruit, dried beans and lentils, baked potatoes, dried fruit, walnuts, white fish, herring, mackerel, sardines, kippers, pilchards, salmon and lean white meat.

The low calorie diet may comprise administration of at least one "diet product". The "diet product" may be formulated to be a meal replacement product or a supplement product which may e.g. suppress the subject's appetite. The diet product can include food products, beverage products, pet food products, food supplements, nutraceuticals, food additives or nutritional formulas.

In one embodiment, the diet product may comprise a product, for example, Optifast® or Modifast®.

The "diet product" may be supplemented with three portions of non-starchy vegetables such that the total energy intake is about 2.5 MJ (600 kcal/day). This may be further supplemented with at least 2 L of water or other energy free beverages per day.

In another embodiment, the "diet product" may comprise, for example, a nutritional formulation which comprises a nutritional composition of the amino acids of the invention and up to at least 46.4% carbohydrate, 32.5% protein and 20.1% with fat, vitamins, minerals and trace elements; which may be supplemented with three portions of non-starchy vegetables such that the total energy intake is about 2.5 MJ (600 kcal/day) per serving and up to a total of 1500 kcal/day. This may be further supplemented with at least 2 L of water or other energy free beverages per day.

In one embodiment, the low calorie diet has a duration of up to 12 weeks. Preferably the low calorie diet has a duration of between 6 and 12 weeks, preferably between 8 and 10 weeks, e.g. 8 weeks.

Amino Acids

The term "amino acid" is a generic term for an organic compound having both an amino group (–NH2) and a carboxyl group (—COOH).

In several embodiments of the invention, specific amino acids and their derivatives are described.

Proline

In several embodiments of the invention, "proline" or a "proline derivative" is defined in the nutritional composition, methods and uses.

"Proline" is an amino acid which is also known as L-proline; L-(−)-Proline; (S)-Pyrrolidine-2-carboxylic acid; (2S)-pyrrolidine-2-carboxylic acid; (−)-Proline, (−)-(S)-Proline; Prolinum; H-Pro-OH,2-pyrrolidinecarboxylic acid; (S)-2-Pyrrolidinecarboxylic acid; prolina,(−)-2-Pyrrolidinecarboxylic acid; L-Pyrrolidine-2-carboxylic acid; L-alpha-Pyrrolidinecarboxylic acid; L-Prolin; Carboxypyrrolidine.

A "proline derivative" is preferably an L-proline and/or defined as being selected from the group consisting of: cis-4-hydroxy-L-proline (CHP), trans-4-hydroxy-L-proline (THP), 4-hydroxy-1-methyl-proline, 1-methyl-4-phenylamine carbonyloxy-proline, 1-methyl-4-phenylamine carbonyloxy-proline, cis-4-hydroxymethyl-1-proline, trans-4-hydroxymethyl-D-proline, trans-4-hydroxymethyl-1-proline, trans-4-methyl-1-proline, cis-3-Amino-1-proline, 1-Methyl-4-phenylaminocarbonyl-oxy-proline-ethylester, 1-Methyl-4-phenylaminocarbonyl-oxy-proline-isobutylester, 4-Hydroxy-1-methyl-proline-ethylester, 4-Hydroxy-1-methyl-proline-isobutylester, 4-Hydroxy-1-methyl-proline-ethylester, 4-Hydroxy-proline ethylester, 4-Hydroxy-proline-isobutylester,cis-4-Hydroxy-L-proline-ethylester, Cis-4-Hydroxy-L-proline-iso-butylester, 4-Hydroxy-1,1-dimethyl-proline-ethylester-iodide, Hydroxyproline-ethylester, 4-Hydroxy-1,1-dimethyl-proline-iso-butylester-iodide,4-Hydroxy-1-cyclohexyl-proline-isobutyl-ester, 4-Hydroxy-1-diphenylmethyl-proline-isobutylester-hydrobromide, 4-Hydroxy-1-methyl-proline,4-Hydroxy-1-alkyl-prolineester amide (alkyl: methy, ethyl, propyl, pentyl, hexyl, heptyl, octyl, and nonyl), 4-Hydroxy-1-diphenylmethyl-proline-isobutyl-ester-hydrobromide. This embodiment encompasses the salts, esters, isomers, racemates, enantiomers or pro-drugs thereof.

Histidine

In several embodiments of the invention, "histidine" or a "histidine derivative" is defined in the nutritional composition, methods and uses.

"Histidine" is an amino acid also known as (S)-4-(2-amino-2-Carboxyethyl)imidazole; (S)-alpha-amino-1H-Imidazole-4-propanoic acid; (S)-alpha-amino-1H-Imidazole-4-propionic acid; (S)-1H-Imidazole-4-alanine; (S)-2-amino-3-(4-Imidazolyl)propionsaeure; (S)-Histidine; (S)1H-Imidazole-4-alanine; 3-(1H-Imidazol-4-yl)-L-alanine; amino-1H-Imidazole-4-propanoate; amino-1H-Imidazole-4-propanoic acid; amino-4-Imidazoleprionate; amino-4-Imidazoleproprionic acid; Glyoxaline-5-alanine.

The histidine is preferably L-histidine and/or a derivative thereof. L-histidine occurs naturally and is readily obtainable from natural sources.

A "histidine derivative" is preferably selected from one or more of a peptides of histidine (particularly di- and tri-peptides of histidine), a peptide of histidine and one or more additional amino acids (particularly di- and tri-peptides, for example carnosine), and a pharmaceutically-acceptable salt of histidine.

Glycine

In several embodiments of the invention, "glycine" or a "glycine derivative" is defined in the nutritional composition, methods and uses.

"Glycine" is an amino acid also known as Aminoacetic acid; Aminoessigsaeure; Aminoethanoic acid; Glycocoll; Glykokoll; Glyzin; Leimzucker; 2-Aminoacetate; amino-Acetic acid; Glicoamin; Glycolixir; Glycosthene; Gyn-hydralin; Padil.

The glycine is preferably L-glycine and/or L-glycine ethyl ester. Non-limiting examples of suitable glycine functional derivatives include D-Allylglycine; N-[Bis(methylthio)methylene]glycine methyl ester; Boc-allyl-Gly-OH (dicyclohexylammonium) salt; Boc-D-Chg-OH; Boc-Chg-OH; (R)—N-Boc-(2'-chlorophenyl)glycine; Boc-L-cyclopropylglycine; Boc-L-cyclopropylglycine; (R)—N-Boc-4-fluorophenylglycine; Boc-D-propargylglycine; Boc-(S)-3-thienylglycine; Boc-(R)-3-thienylglycine; D-a-Cyclohexylglycine; L-a-Cyclopropylglycine; N-(2-fluorophenyl)-N-(methylsulfonyl)glycine; N-(4-fluorophenyl)-N-(methylsulfonyl)glycine; Fmoc-N-(2,4-dimethoxybenzyl)-Gly-OH; N-(2-Furoyl)glycine; L-a-Neopentylglycine; D-Propargylglycine; sarcosine; Z-a-Phosphonoglycine trimethyl ester.

Hydroxyproline

In several embodiments of the invention, "hydroxyproline" is defined in the nutritional composition, methods and uses.

"Hydroxyproline" is also known as (2S,4R)-4-Hydroxypyrrolidine-2-carboxylic acid; or L-hydroxyproline. Hydroxyproline differs from proline by the presence of a hydroxyl (OH) group attached to the gamma carbon atom.

Diet Product

The diet product can comprise (i) a source of protein, (ii) a source of fat and (iii) a source of carbohydrates in addition to the one or more amino acids of the invention.

Protein

The term "protein" as used herein includes free form amino acids, molecules between 2 and 20 amino acids (referenced herein as "peptides"), and also includes longer chains of amino acids as well. Small peptides, i.e., chains of 2 to 10 amino acids, are suitable for the composition alone or in combination with other proteins. The "free form" of an amino acid is the monomeric form of the amino acid. Suitable amino acids include both natural and non-natural amino acids. The composition can comprise a mixture of one or more types of protein, for example one or more (i) peptides, (ii) longer chains of amino acids, or (iii) free form amino acids; and the mixture is preferably formulated to achieve a desired amino acid profile/content.

The composition can comprise a protein that provides at least a portion of the one or more amino acids and/or at least a portion of the one or more amino acids, and at least a portion of the protein can be from animal or plant origin, for example dairy protein such as one or more of milk protein, e.g., milk protein concentrate or milk protein isolate; caseinates or casein, e.g., micellar casein concentrate or micellar casein isolate; or whey protein, e.g., whey protein concentrate or whey protein isolate. Additionally or alternatively, at least a portion of the protein can be plant protein such as one or more of soy protein or pea protein.

Mixtures of these proteins are also suitable, for example mixtures in which casein is the majority of the protein but not the entirety, mixtures in which whey protein is the majority of the protein but not the entirety, mixtures in which pea protein is the majority of the protein but not the entirety, and mixtures in which soy protein is the majority of the protein but not the entirety. In an embodiment, at least 10 wt. % of the protein is whey protein, preferably at least 20 wt. %, and more preferably at least 30 wt. %. In an embodiment, at least 10 wt. % of the protein is casein, preferably at least 20 wt. %, and more preferably at least 30 wt. %. In an embodiment, at least 10 wt. % of the protein is plant protein, preferably at least 20 wt. %, more preferably at least 30 wt. %.

Whey protein may be any whey protein, for example selected from the group consisting of whey protein concentrates, whey protein isolates, whey protein micelles, whey protein hydrolysates, acid whey, sweet whey, modified sweet whey (sweet whey from which the caseino-glycomacropeptide has been removed), a fraction of whey protein, and any combination thereof.

Casein may be obtained from any mammal but is preferably obtained from cow milk and preferably as micellar casein.

The protein may be unhydrolyzed, partially hydrolyzed (i.e., peptides of molecular weight 3 kDa to 10 kDa with an average molecular weight less than 5 kDa) or extensively hydrolyzed (i.e., peptides of which 90% have a molecular weight less than 3 kDa), for example in a range of 5% to 95% hydrolyzed. In some embodiments, the peptide profile of hydrolyzed protein can be within a range of distinct molecular weights. For example, the majority of peptides (>50 molar percent or >50 wt. %) can have a molecular weight within 1-5 kDa, or 5-10 kDa, or 10-20 kDa.

Fats

In an embodiment, the composition includes a source of fat. The source of fat may include any suitable fat or fat mixture. Non-limiting examples of suitable fat sources include vegetable fat, such as olive oil, corn oil, sunflower oil, high-oleic sunflower, rapeseed oil, canola oil, hazelnut oil, soy oil, palm oil, coconut oil, blackcurrant seed oil, borage oil, lecithins, and the like, animal fats such as milk fat; or combinations thereof.

Carbohydrates

In an embodiment, the composition includes a source of carbohydrates. Any suitable carbohydrate may be used in the composition including, but not limited to, starch (e.g., modified starch, amylose starch, tapioca starch, corn starch), sucrose, lactose, glucose, fructose, corn syrup solids, maltodextrin, xylitol, sorbitol or combinations thereof.

The source of carbohydrates is preferably not greater than 50 energy % of the composition, more preferably not greater than 36 energy % of the composition, and most preferably not greater than 30 energy % of the composition.

Nutritional Formulation

The composition can be any kind of composition formulated such that it is suitable for human and/or animal consumption. For example, the composition may be selected from the group consisting of food compositions, dietary supplements, nutritional compositions, nutraceuticals, powdered nutritional products to be reconstituted in water or milk before consumption, food additives, medicaments, beverages and drinks. In an embodiment, the composition is an oral nutritional supplement (ONS), a complete nutritional formula, a pharmaceutical, a medical or a food product. In a preferred embodiment, the composition is administered to the individual as a beverage. The composition may be stored in a sachet as a powder and then suspended in a liquid such as water for use.

In some embodiments, the composition is administered to the individual in a single dosage form, i.e. all compounds are present in one product to be given to an individual in combination with a meal. In other embodiments, the composition is co-administered in separate dosage forms, for example at least one component separately from one or more of the other components of the composition.

EXAMPLES

The following non-limiting examples present scientific data developing and supporting the concept of administering a composition comprising one or more amino acids of the invention, the composition further comprising one or more amino acids in an amount effective for the composition to be useful for a in need of weight loss or for weight maintenance after weight loss. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Example 1: Cohort on Dietary Intervention of a Meal Replacement OPTIFAST

The clinical trial OPTIWIN tested the effectiveness of the OPTIFAST program (OP) which is a total meal replacement dietary intervention, compared with a food-based (FB) dietary plan for weight loss (Ard et al. Obesity (Silver Spring). 2019 January; 27(1): 22-29).

OPTIWIN was an open-label, multicenter, randomized controlled clinical trial. The nine participating US centers included five private clinics and four academic medical centers. Participants had to be 18 to 70 years old and nonsmokers with BMI of 30 to 55 kg/m². Key exclusions included recent weight loss or use of weight-loss medications, previous bariatric surgery, organ failure, type 1 diabetes or hemoglobin $A_{1c}$>10%, cardiovascular disease event or mental health hospitalization in the past 6 months, alcohol or drug dependence, positive screening for potential eating disorder, or poorly controlled depression. Volunteers were screened by telephone to assess initial eligibility, followed by an in-person visit to confirm eligibility and obtain written informed consent. Eligible individuals completed a 7-day run-in diet that included use of one serving of a meal replacement (OPTIFAST; Nestlé Health Science, Bridgewater, New Jersey) daily to assess tolerance to the product. The final screening visit was completed after the run-in to assess adherence to the run-in diet, self-monitoring tasks, and final eligibility. This study was overseen and approved by a central institutional review board (Quorum) after review by each site's institutional review board and was registered on ClinicalTrials.gov NCT02635698.

Treatment Arms

Participants were randomized to groups either OPTIFAST (OP) or Food Based (FB).

Optifast Group (OP):

Participants with BMI<45 were instructed to use five meal replacements which consisted of Optifast per day (800 kcal total) with 40% of calories as protein, 40% as carbohydrate, and 20% as fat. Participants with BMI of 45 to 49.9 received six MRs per day (960 kcal); those with BMI≥50 received six MRs plus one meal daily of lean protein (3-4 ounces) and one nonstarchy vegetable serving (1,100-1,200 kcal). Participants followed their prescription for 12 to 16 weeks based on provider discretion and patient preference, after which there was gradual reintroduction of food through week 26. After week 26, participants' calories were gradually increased to achieve weight stability. During this time, participants were advised to use one to two MRs daily to facilitate weight-loss maintenance.

Participants saw a clinician regularly to address health concerns and adjust medications for a total of 11 medical monitoring visits during the first 26 weeks and 4 medical monitoring visits in weeks 27 to 52. Labs for medical monitoring, including either a basic or comprehensive metabolic panel, were obtained at weeks 2, 4, 6, 8, 10, 12, and 16. Participants had individual counseling with trained interventionists for a total of 16 individual counseling visits through the first 26 weeks and 11 individual counseling visits from week 27 through week 52.

Food Based Group (FB):

During active weight loss (0-26 weeks), FB participants were prescribed a calorie-restricted diet emphasizing lower fat intake (25%-30% of total calories). They were advised to reduce calories by 500 to 750 kcal below estimated total energy expenditure, calculated based on resting metabolic rate measured by indirect calorimetry (MedGem; Microlife USA, Inc., Clearwater, Florida) plus an activity factor based on self-reported physical activity. To balance the incentive of free MR in the OP arm, FB participants received gift cards totaling $800 to offset the cost of groceries during the active weight-loss phase. They also had two medical monitoring visits and seven individual counseling visits through week 26. During the maintenance phase (27-52 weeks), they had two medical monitoring visits and five individual counseling visits.

Analysis

Sample size was calculated primarily to show effectiveness of OP compared with FB on percent weight change at 52 weeks. To obtain 90% statistical power based on a two-sided test assuming $\alpha$=0.05, 113 participants per study group were required to detect a mean difference in weight change of 5% with an estimated standard deviation (SD) of 11.5%. With an estimated dropout rate of 30%, we planned to recruit 300 participants to provide 150 participants per study group.

The coprimary outcomes were percent change in body weight from baseline to weeks 26 and 52, tested using a hierarchical procedure. First, we planned to test the week 26 outcome. If this analysis was statistically significant (P<0.05), then the week 52 end point would be tested at the α=0.05 level of significance. However, if the week 26 analysis was not statistically significant, then the week 52 analysis would be exploratory rather than confirmatory.

The primary analysis population was a modified intention-to-treat (mITT) population, consisting of randomized subjects known to have started the study program and have at least one postbaseline assessment of body weight. For the primary analysis, we used a repeated-measures model with both random and fixed effects to compare the percent weight change between the OP and FB groups. The linear mixed model included a random intercept for subject, fixed visit effect, fixed treatment effect, and fixed baseline body weight effect, as well as a treatment-by-visit interaction term. The model also included age, race, sex, site, diabetes status, and gender as covariates. The final model was fit using the SAS PROC MIXED procedure using the RANDOM and LSMEANS statements (SAS Institute, Inc., Cary, North Carolina). A sensitivity analysis employed multiple imputation (MI) for missing body weight values at scheduled postbaseline visits (weeks 12, 26, 40, and 52) in the mITT population. Imputation was performed separately (imputations=50) for each treatment group using the SAS PROC MI procedure. Primary outcomes were then calculated from the imputed data sets. For secondary outcomes including body composition and AE frequency, continuous measures were compared using standard t tests, while categorical measures were compared using $\chi^2$ tests.

Results

We screened 463 participants and confirmed eligibility on 330 participants (164 randomized to OP and 166 randomized to FB). There were 57 participants who either declined further participation in the study after learning their randomization assignment (9 OP; 16 FB) or discontinued participation without a follow-up weight (20 OP; 12 FB); these participants were demographically similar to the mITT population, except they were younger (42.5 years; P=0.006) and reported less weight loss on average with prior attempts (0.1 kg; P<0.001). The remaining 273 participants (135 OP; 138 FB) made up the mITT study population (82.7% of randomized participants). In the mITT study population, there were 19 participants in the OP group (14.1%) and 25 (18.1%) in the FB group who discontinued participation. Participants were typically middle-aged (47.1±11.2 years), predominately female (82%), and white (71%) (Table 1). Fifty-two percent had prediabetes or diabetes, 33% were being treated for hypertension, and 21% were being treated for dyslipidemia. OP and FB participants attended 53.5% and 46.2% of weekly group behavioral sessions, respectively.

TABLE 1

Summary of demographic and baseline characteristics according to treatment groups

| | OPTIFAST program (n = 135) | FB program (n = 138) | Total (N = 273) | P value |
|---|---|---|---|---|
| Age, y mean (SD) | 47.1 (11.2) | 47.2 (11.3) | 47.1 (11.2) | 0.88 |
| Sex, n (%) | | | | |
| Male | 19 (14.1) | 29 (21.0) | 48 (18) | 0.13 |
| Female | 116 (85.9) | 109 (79.0) | 225 (82) | |
| Race, n (%) | | | | |
| Caucasian | 100 (74.1) | 95 (68.8) | 195 (71) | 0.10 |
| African American | 22 (16.3) | 37 (26.8) | 59 (22) | |
| Asian/Pacific Islander | 4 (3.0) | 2 (1.4) | 6 (2) | |
| Hispanic | 5 (3.7) | 4 (2.9) | 9 (3) | |
| Other | 4 (3.0) | 0 (0) | 4 (1) | |
| Baseline characteristics | | | | |
| Weight, kg, mean (SD) | 106.8 (20.8) | 109.9 (23.2) | 108.4 (22.1) | 0.26 |
| BMI, kg/m$^2$, mean (SD) | 38.4 (5.5) | 39.2 (6.2) | 38.8 (5.9) | 0.26 |
| BMI categorization, n (%) | | | | |
| Overweight (25-29.9 kg/m$^2$) | 0 (0) | 3 (2.2) | 3 (1) | 0.13 |
| Obesity class I (30.0-34.9 kg/m$^2$) | 44 (32.6) | 38 (27.5) | 82 (30) | |
| Obesity class II (35-39.9 kg/m$^2$) | 43 (31.9) | 36 (26.1) | 79 (29) | |
| Obesity class III (≥40 kg/m$^2$) | 48 (35.6) | 61 (44.2) | 109 (40) | |
| Type 2 diabetes diagnosis, n (%) | 13 (9.6) | 20 (14.5) | 33 (12.1) | 0.22 |
| Prediabetes diagnosis, n (%) | 57 (42.2) | 49 (35.5) | 106 (38.8) | 0.26 |
| Number of previous weight-loss attempts, kg, mean (SD) | 5.5 (8.3) | 7.0 (9.2) | 6.3 (8.8) | 0.19 |
| Typical weight loss with previous weight-loss attempts, kg, mean (SD) | 2.1 (5.3) | 2.4 (6.6) | 2.2 (6.0) | 0.67 |
| Used diabetes medications [a] | 14 (10%) | 19 (14%) | 33 (12%) | 0.39 |
| Used hypertension medications [a] | 46 (34%) | 43 (31%) | 89 (33%) | 0.61 |
| Used lipid-modifying medications [a] | 29 (21%) | 29 (21%) | 58 (21%) | 0.92 |

Continuous variables compared using standard t test. Categorical variables compared using $\chi 2$ test with the exception of race, which used Fisher exact test because of small cell counts.
[a] Medication use includes use prior to study with continuation during study or medication use that started during study and either continued throughout study or ended before study completion.

Weight-Loss Outcomes

Both treatment groups lost weight at 26 and 52 weeks (Percent weight loss at 26 weeks was 12.4%±0.6% for OP compared with 6.0%±0.6% for FB (difference 6.4%±0.9%; P<0.001). At 52 weeks, percent weight loss was 10.5%±0.6% for OP versus 5.5%±0.6% for FB (difference 4.9%±0.9%; P<0.001). Sensitivity analyses showed similar estimates for percent weight loss. Using MI to handle missing data showed a weight loss of 12.1%±0.6% and 10.1%±0.7% for OP at 26 and 52 weeks, respectively. Comparatively, FB had weight loss of 6.0%±0.6% and 5.5%±0.7% at 26 and 52 weeks. All differences between OP and FB remained significant at P<0.001.

Relative weight change by treatment group at 26 weeks and 52 weeks. Percent weight change values are calculated from a least square means from a linear mixed model. The linear mixed model contains a random intercept subject effect, fixed visit effect, fixed treatment effect, fixed baseline body weight effect, treatment-by-visit interaction term, and covariates including age, race, sex, site, and reported baseline diabetes status.

At week 52, higher proportions of OP participants achieved 5% (63.7%) and 10% weight loss (43.7%) compared with FB (42% and 21.7%, respectively; P<0.001). The percentage of people who lost 15% or more of their initial weight was more than double in OP than FB (30% vs. 12%; P<0.001). We also examined the proportion of participants who were nonresponders to assigned treatments, defined by a failure to lose ≥3% of their initial body weight. At week 26, 15.6% of OP and 39.1% of FB participants were nonresponders. By week 52, 23.7% of OP participants were nonresponders versus 43.5% of FB participants.

Changes in Body Composition

Changes in body composition outcomes are shown in Table 2. Changes in waist circumference paralleled weight loss in both treatment groups; however, there were greater reductions for the OP group compared with FB at both 26 and 52 weeks. Changes in body composition measured by dual-energy x-ray absorptiometry followed a similar pattern. By week 52, mean total fat mass was decreased by 9.7±10.4 kg for OP participants. The mean reduction in total fat mass for FB participants was 3.5±6.6 kg at 52 weeks. Both treatment groups also had decreases in lean mass. The absolute difference was statistically significant; however, the proportion of weight loss from lean mass at 52 weeks was similar (23% for OP; 25.5% for FB). There was no difference in change in total bone mineral density by treatment group.

TABLE 2

Change in body composition outcomes from baseline

| Outcome | OPTIFAST program (n = 135) Mean (SD) | FB program (n = 138) Mean (SD) | P value |
|---|---|---|---|
| Waist circumference (cm) | | | |
| Baseline | 116.6 (14.0) | 119.5 (15.2) | 0.10 |
| Change at 26 weeks | −12.0 (16.0) | −7.7 (8.3) | 0.011 |
| Change at 52 weeks | −11.9 (12.1) | −7.2 (9.3) | 0.0011 |
| Total body fat mass (kg) | | | |
| Baseline | 49.8 (11.8) | 49.7 (11.7) | 0.96 |
| Change at 26 weeks | −11.3 (7.5) | −4.4 (5.9) | <0.0001 |
| Change at 52 weeks | −9.7 (10.4) | −3.5 (6.6) | <0.0001 |

TABLE 2-continued

Change in body composition outcomes from baseline

| Outcome | OPTIFAST program (n = 135) Mean (SD) | FB program (n = 138) Mean (SD) | P value |
|---|---|---|---|
| Total body lean mass (kg) | | | |
| Baseline | 51.6 (9.6) | 53.5 (12.1) | 0.15 |
| Change at 26 weeks | −2.3 (2.8) | −1.1 (3.3) | 0.008 |
| Change at 52 weeks | −2.9 (5.8) | −1.2 (5.9) | 0.043 |
| Bone mineral density, total (g/cm$^2$) | | | |
| Baseline | 1.2 (0.1) | 1.3 (0.1) | 0.026 |
| Change at 26 weeks | −0.01 (0.04) | −0.006 (0.03) | 0.28 |
| Change at 52 weeks | −0.01 (0.04) | −0.01 (0.03) | 0.95 |

Change from baseline defined as postbaseline value-baseline value. Differences compared using standard t test.

Participants in the OP treatment arm lost 10.5% of their initial weight by 52 weeks, representing a near doubling of the effect on body weight seen with FB. A larger proportion of participants lost 5%, 10%, or 15% of their body weight with OP, and a greater percentage of people responded with at least 3% weight loss to OP. The OP participants had greater losses of fat mass, and OP was well tolerated and safe. Overall, OP proved to be a more effective treatment than FB.

The OP group achieved greater weight loss through 12 months, experiencing less of the weight regain. Following weight loss with ongoing use of meal replacements such as OPIFAST for weight-loss maintenance may be advantageous because of the characteristics of MR associated with lower energy intake (e.g., portion control, low calories, reduced choice) and because of changes in an individual's subjective cravings and desire for food, which have been objectively supported by functional magnetic resonance imaging showing contemporaneous changes in the brain regions responsible for regulation of food intake and reward. Continued treatment and use of meal replacement can be important for ongoing maintenance of lost weight.

Example 2: Methods of Measuring Amino Acids

Blood plasma samples were analysed from the OP group subjects described above at baseline, 26 weeks and 52 weeks to determine the concentrations in amino acids. In particular, proline, histidine, glycine and hydroxyproline were measured.

Tandem mass spectrometry (UPLC-MS/MS) was used for the analysis of amino acids. Separation and analysis were performed on an Accela UHPLC 1250 Pump (Thermo Fisher Scientific Inc., Waltham, MA, USA) coupled to a TSQ Quantum Vantage triple quadrupole (Thermo Fisher Scientific Inc., Waltham, MA, USA) equipped with a heated electrospray ionization (H-ESI) source. Chromatographic separation was obtained using gradient elution on a reversed-phase UPLC XSelect HSST3 2.5 μm, 100×2.1 mm I.D. column (Waters Corporation, Milford, MA, USA). The injection volume was 10 μL and the total run time of analysis was 13 min. Plasma samples were thawed and vortexed for 10 s. A 50-4, volume of plasma was transferred by pipetting into a 1.5-mL microcentrifuge tube. Ten microliters of IS solution was added to plasma. Fifty microliters of TCEP solution and then 140 μL of methanol+1% FA were then added to the mixture. The tubes were placed in a multitube vortexer for 15 min at 1350 rpm at 4° C. and centrifuged at 14,500 rpm for 5 min. The supernatants were pipetted and filtered through a 0.22-μm filter and placed into vials for LC-MS/MS analysis.

Changes in blood amino acid during weight-loss were tested for association with changes in anthropometric variables changes during the whole intervention (i.e after WM) using sparse Partial Least Squares (sPLS) approach. The sample consisted in 71 participants with data at baseline (V1), after 12 weeks (V2) and after 24 weeks (v3) of weight loss program.

The sparse Partial Least Squares (sPLS) approach implemented in mixOmics R package combines both integration and variable selection simultaneously on two data sets (amino acids and anthropometric variables) in a one-step strategy. It is a multivariate methodology which relates two data matrices X (e.g. anthropometrics) and Y (amino acids). sPLS goes beyond traditional multiple regression by modelling the structure of both matrices. Unlike traditional multiple regression models, it is not limited to uncorrelated variables. One of the many advantages of sPLS is that it can handle many noisy, collinear (correlated) and missing variables, and can also simultaneously model several response variables Y. Variable selection is achieved by introducing LASSO penalization on the pair of loading vectors. A Clustered Image Maps (CIM) is provided to summarize and visualize sPLS results. Missing data were imputed via bagging. the method fits a bagged tree model for each predictor (as a function of all the others). CIM is based on a hierarchical clustering simultaneously applied on the rows and the columns of a real-valued similarity matrix obtained via the results of the sPLS. Networks plots are also provided to represent the relevant associations between the 2 sets of variables. They are inferred form pairwise association score between X and Y variables as provided by the sPLS. The threshold is to represent only the variables X and Y with an association score greater than a given cutoff.

The analysis assumed a 3 components model was adopted for visualization and interpretation. The results are reported in Table 3 as per the CIM element values.

The analysis highlights strong associations between blood amino acids changes during weight loss (V2/V1) and body composition status reached at the end of the weight maintenance period (V3/V1). In particular, changes in proline were positively associated with lean mass changes, and negatively with BMI and fat mass changes. In addition, changes in glycine and histidine, associated negatively with changes in fat mass and BMI. Such observations translate with the fact that (i) greater loss of fat mass and BMI is achieved in subject showing no or weak depletion in proline, histidine and glycine, and (ii) greater preservation of lean mass is observed in subjects showing weak depletion in proline.

Hydroxyproline is produced by hydroxylation of the amino acid proline. Hydroxyproline content is well known marker of collagen catabolism, especially bone resorption or tissue degradation, including muscle damage. Changes in hydroxyproline to proline ratio were negatively associated with lean mass changes, and positively associated with changes in fat mass and BMI. Specifically, higher conversion of hydroxyproline to proline, yielded a greater is the loss of lean mass.

TABLE 3

| | CIM Values | | | |
|---|---|---|---|---|
| | Hydroxy Proline/ Proline Ratio | Glycine | Proline | Histidine |
| Lean.Mass | −0.157 | 0.04702 | 0.08599 | 0.00118 |
| Fat.Mass | 0.09516 | −0.07025 | −0.1884 | −0.1308 |
| BMI | 0.07592 | −0.1706 | −0.1251 | −0.08986 |

The invention claimed is:

1. A method for weight loss in a subject with a diet-resistant obesity or weight-loss resistant obesity, the method comprising administering a nutritional composition comprising one or more amino acids selected from the group consisting of: proline, histidine, glycine, hydroxyproline and mixtures thereof to the subject.

2. A method for maintenance of weight in an individual with a diet-resistant obesity or weight-loss resistant obesity, the method comprising administering a nutritional composition comprising one or more amino acids selected from the group consisting of: proline, histidine, glycine, hydroxyproline and mixtures thereof to the individual.

3. The method according to claim 1, wherein the method comprises a low caloric intervention.

4. The method according to claim 3, wherein the low caloric dietary intervention is between 600 kcal/day and 1500 kcal/day for up to 12 weeks for the subject.

5. The method according to claim 1, wherein the nutritional composition comprises at least proline.

6. The method according to claim 1, wherein the nutritional composition comprises at least proline and histidine.

7. The method according to claim 1, wherein the nutritional composition comprises at least proline, histidine and glycine.

8. The method according to claim 1, wherein the nutritional composition comprises at least proline, histidine, glycine and hydroxyproline.

9. The method according to claim 1, wherein the nutritional composition improves fat mass loss in the subject following a low caloric dietary intervention.

10. The method according to claim 1, wherein the nutritional composition improves BMI in the subject following a low caloric dietary intervention.

11. The method according to claim 2, wherein the nutritional composition maintains fat mass loss in the individual following a low caloric dietary intervention.

12. The method according to claim 2, wherein the nutritional composition maintains BMI in the individual following a low caloric dietary intervention.

13. The method according to claim 1, wherein the one or more amino acids are administered simultaneously to the subject together with a low caloric dietary intervention in a diet product.

14. A method of reducing BMI in a subject with a diet-resistant obesity or weight-loss resistant obesity, the method comprising administrating to the subject a nutritional composition comprising one or more amino acids selected from the group consisting of: proline, histidine, glycine, hydroxyproline and mixtures thereof.

15. The method according to claim 2, wherein the method comprises a low caloric intervention.

16. The method according to claim 2, wherein the nutritional composition comprises at least proline.

17. The method according to claim 2, wherein the nutritional composition comprises at least proline and histidine.

18. The method according to claim 2, wherein the nutritional composition comprises at least proline, histidine and glycine.

19. The method according to claim 2, wherein the nutritional composition comprises at least proline, histidine, glycine and hydroxyproline.

20. The method according to claim 14, wherein the nutritional composition comprises at least proline.

\* \* \* \* \*